(12) United States Patent
Mathew et al.

(10) Patent No.: US 7,827,439 B2
(45) Date of Patent: Nov. 2, 2010

(54) SYSTEM AND METHOD OF REDUNDANTLY STORING AND RETRIEVING DATA WITH COOPERATING STORAGE DEVICES

(75) Inventors: George Mathew, San Jose, CA (US); Craig K. Harmer, San Francisco, CA (US); Oleg Kiselev, Palo Alto, CA (US); Ronald S. Karr, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 301 days.

(21) Appl. No.: 12/208,882

(22) Filed: Sep. 11, 2008

(65) Prior Publication Data

US 2009/0089612 A1    Apr. 2, 2009

Related U.S. Application Data

(60) Provisional application No. 60/976,302, filed on Sep. 28, 2007.

(51) Int. Cl.
*G06F 11/00* (2006.01)
(52) U.S. Cl. .......................................... 714/5; 711/114
(58) Field of Classification Search .................. None
See application file for complete search history.

(56) References Cited

U.S. PATENT DOCUMENTS

| | | | |
|---|---|---|---|
| 5,708,668 A * | 1/1998 | Styczinski ................... | 714/6 |
| 5,878,414 A | 3/1999 | Hsiao et al. | |
| 5,966,706 A | 10/1999 | Biliris et al. | |
| 6,301,625 B1 * | 10/2001 | McDonald et al. ............. | 710/5 |
| 6,457,098 B1 | 9/2002 | DeKoning et al. | |
| 6,553,509 B1 | 4/2003 | Hanson et al. | |
| 6,654,831 B1 * | 11/2003 | Otterness et al. .............. | 710/74 |
| 6,807,642 B2 | 10/2004 | Yamamoto et al. | |
| 6,851,005 B1 | 2/2005 | Gnanasivam et al. | |

(Continued)

FOREIGN PATENT DOCUMENTS

WO    WO 03/009124    1/2003

OTHER PUBLICATIONS

European Search Report Application No. 08164691.1-1225 / 2096542 mailed Jun. 25, 2010.

*Primary Examiner*—Gabriel L Chu
(74) *Attorney, Agent, or Firm*—Rory D. Rankin; Meyertons, Hood, Kivlin, Kowert & Goetzel, P.C.

(57) ABSTRACT

A system and method for data storage in an array. A system includes a client coupled to a storage subsystem. The storage subsystem comprises data storage locations addressable as rows and columns in an array. Each column comprises a separate storage device. Each row includes redundant data. For a given row, a coordinating storage device receives data from the client, coordinates computation and storage of redundant data, and forwards data to other storage devices. In response to receiving data targeted for storage in a given storage location, a non-volatile, temporary storage device that is associated with the separate storage device that includes the given storage location buffers the received data. The coordinating storage device conveys a write completion message to the client in response to detecting that the data has been buffered in the non-volatile, temporary storage devices. At least two storage devices are coordinating storage devices in separate rows.

20 Claims, 11 Drawing Sheets

U.S. PATENT DOCUMENTS

| | | |
|---|---|---|
| 6,871,228 B2 | 3/2005 | Shah et al. |
| 6,877,109 B2 | 4/2005 | Delaney et al. |
| 6,880,062 B1 | 4/2005 | Ibrahim et al. |
| 6,895,415 B1 | 5/2005 | Rezaul Islam et al. |
| 7,096,316 B1 | 8/2006 | Karr et al. |
| 7,702,850 B2 * | 4/2010 | Ludwig et al. ............... 711/114 |
| 2002/0194428 A1 * | 12/2002 | Green ........................ 711/114 |
| 2003/0115437 A1 | 6/2003 | Tomita |
| 2005/0033912 A1 * | 2/2005 | Abe ........................... 711/114 |
| 2006/0047896 A1 | 3/2006 | Nguyen et al. |
| 2008/0307161 A1 * | 12/2008 | Wei ........................... 711/114 |

* cited by examiner

SYSTEM AND METHOD OF REDUNDANTLY STORING AND RETRIEVING DATA WITH COOPERATING STORAGE DEVICES

CROSS REFERENCE TO RELATED APPLICATIONS

This application claims the benefit of priority to U.S. Provisional Patent Application No. 60/976,302, entitled "System And Method Of Redundantly Storing And Retrieving Data With Cooperating Storage Devices," filed Sep. 28, 2007, the entirety of which is incorporated herein by reference.

BACKGROUND OF THE INVENTION

1. Field of the Invention

This invention relates to computer systems and, more particularly, to data storage subsystems within computer systems.

2. Description of the Related Art

Computer systems frequently include data storage subsystems for storing data. In particular, computer systems that include multiple clients interconnected by a network increasingly share one or more data storage subsystems via a network. The data storage subsystems may include or be further coupled to storage consisting of one or more disk storage devices, tape drives, or other storage media. A computer system may also include one or more servers in which metadata describing the contents of the included storage devices is maintained.

Data storage subsystems may store data with some redundancy to allow for recovery from storage errors. There are a variety of techniques to store data redundantly, including erasure coding techniques such as Reed-Solomon encodings and RAID (Redundant Array of Independent Disks) using a variety of layouts, such as RAID-1, RAID-5, or RAID-6. These RAID layouts may be implemented within an object-based file system in which each independent storage device is treated as a disk. Each client device may convey data to the storage devices via a network. Unfortunately, some way of arbitrating write access requests from multiple clients may be needed to avoid introducing inconsistencies into the redundant data. One arbitration approach is to require each client to obtain a lock before accessing a storage location. However this approach requires that each client be responsible for and trusted to perform all of the functions involved in sequencing writes using the lock mechanism. For example, in the case of RAID-5 or RAID-6, these functions may include reading old data and old parity, computing new parity, logging the new data and new parity, and writing the new data and new parity to their respective storage locations that together constitute a part of or the whole of a row in the RAID layout. In addition, a client may be required to retrieve information from the Meta Data Server (MDS) for each write to an individual location in the RAID layout. The performance of these functions increases write latency and adds complexity and significant computational and storage overhead to each client.

In addition to the above considerations, data storage subsystems are designed to minimize the loss of data that may occur when one or more devices fail. Although RAID layouts are intended to provide high availability and fault tolerance, there may be periods of increased vulnerability to device failure during complex write operations if clients are responsible for maintaining the redundancy. In view of the above, a more effective system and method for managing writes to data storage subsystems that accounts for these issues are desired.

SUMMARY OF THE INVENTION

Various embodiments of a computer system and methods are disclosed. In one embodiment, a computer system includes a client coupled to a storage subsystem. The storage subsystem comprises a plurality of data storage locations addressable as rows and columns in an array. Each column of the array comprises a separate storage device. Data stored in each row of the array includes at least some redundant data. For a given row in the array, a predetermined one of the plurality of storage devices is designated as a coordinating storage device. At least two of the plurality of storage devices are designated as coordinating storage devices in separate sets of one or more rows. For a given row in the array, the coordinating storage device is configured to receive data from the client for storage in the given row, forward one or more portions of the received data to one or more other ones of the plurality of storage devices, and coordinate the computation and storage of the at least some redundant data in the given row. In response to receiving a portion of data targeted for storage in a given storage location, a non-volatile, temporary storage device that is associated with the separate storage device that includes the given storage location is configured to buffer the received portion of data.

In a further embodiment, the coordinating storage device is configured to convey a write completion message to the client in response to detecting that the one or more portions of the data have been buffered in the non-volatile, temporary storage devices. The system is further configured to detect a failure of at least one of the plurality of storage devices. If the failure occurred after a write completion message has been conveyed and before at least a portion of the buffered data has been transferred from the non-volatile temporary storage devices to associated storage locations in a given row, the system is further configured to rebuild the data stored in the given row including the at least some redundant data from the data that was stored in the non-volatile temporary storage devices. If the failure occurred after the buffered data has been transferred from the non-volatile temporary storage devices to associated storage locations in a given row, the system is further configured to rebuild the data stored in the given row including the at least some redundant data from the data that was stored in the given row. The coordinating storage device is further configured to compute parity values or erasure-coding values of a plurality of portions of data stored in the given row. In one embodiment, in response to a signal indicating that parity or erasure-coding values have been computed for the given row, each non-volatile, temporary storage device is further configured to transfer a buffered portion of data to a storage location in the given row of the associated separate storage device. In an alternative embodiment, in response to a signal indicating that data for computing parity or erasure-coding values have been received by the coordinating storage device for the given row, each non-volatile, temporary storage device is further configured to transfer a buffered portion of data to a storage location in the given row of the associated separate storage device. In still further embodiments, the redundant array comprises a RAID-5 layout, a RAID-6 layout, a RAID-1 layout, or other redundant or erasure-coded layout.

These and other embodiments will become apparent upon consideration of the following description and accompanying drawings.

Figure 1:
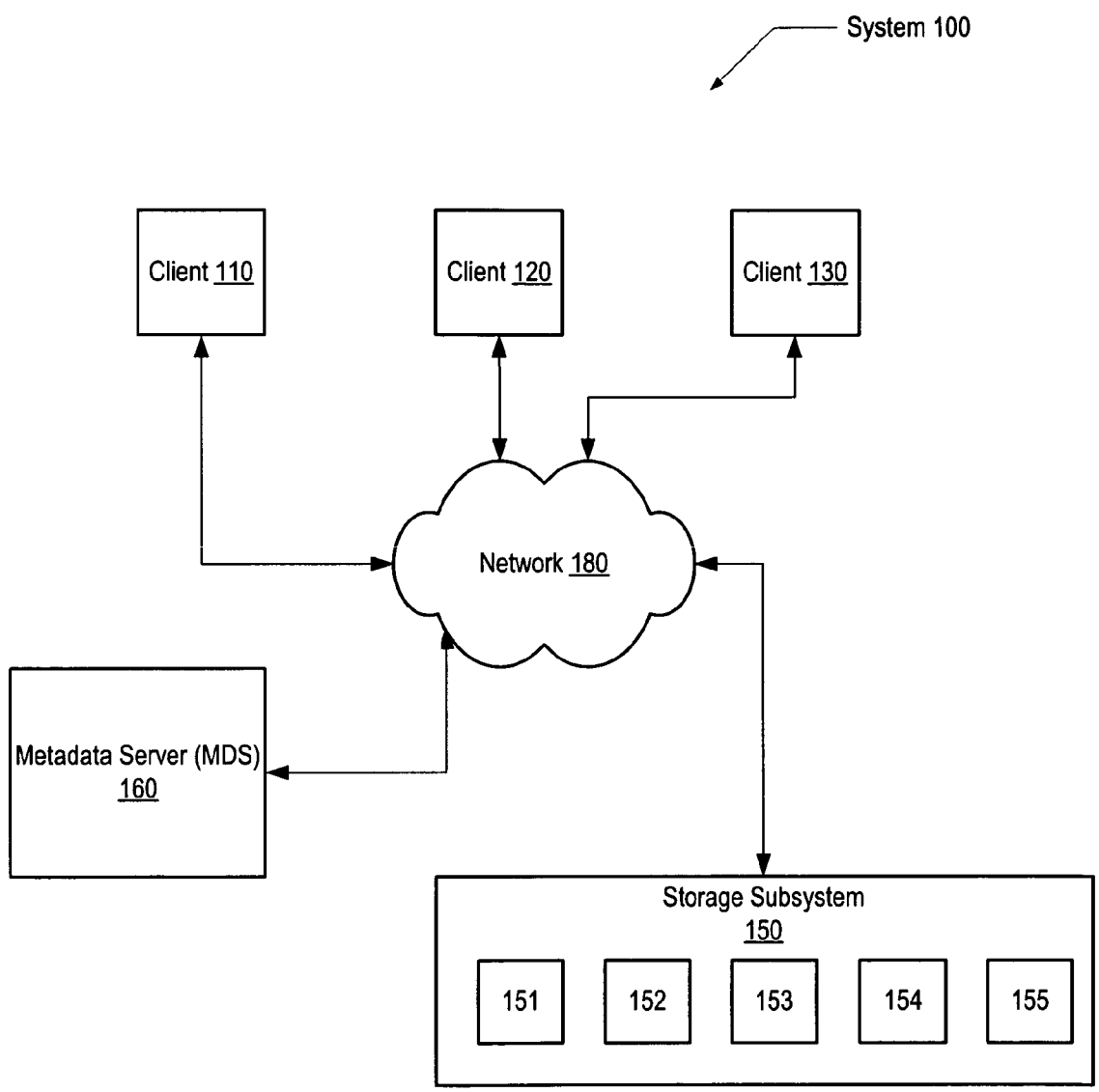
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computer system 100. As shown, system 100 includes clients 110, 120, and 130, a storage subsystem 150, and a metadata server (MDS) 160 interconnected through a network 180. Clients 110, 120, and 130 are representative of any number of stationary or mobile computers such as desktop PCs, workstations, laptops, handheld computers, blade servers, etc. Although system 100 is described as including client and servers, in alternative embodiments the functions performed by clients and servers may be performed by peers in a peer-to-peer configuration or by a combination of clients, servers, and peers.

In alternative embodiments, the number and type of clients, servers, and storage devices is not limited to those shown in FIG. 1. Almost any number and combination of servers, desktop, and mobile clients may be interconnected in system 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to system 100.

Within system 100, it may be desired to store data associated with any of clients 110, 120, and 130 within storage subsystem 150. Subsystem 150 may include individual storage devices 151-155. Storage devices 151-155 may be any of a variety of devices such as hard disks, server blades, or specialized devices, and may include a variety of memory devices such as RAM, Flash RAM, MEMS (MicroElectro-Mechanical Systems) storage, battery-backed RAM, and/or non-volatile RAM (NVRAM), etc. Client data may be stored within storage subsystem 150 in one of a variety of well-known layouts, such as RAID-1, RAID-DP, RAID-5, RAID-6, an erasure-coded data representation scheme, etc. in which the reliability of storage may be enhanced by redundancy and/or error correction capabilities. Metadata describing the layout of data stored in storage subsystem 150 may be stored in MDS 160. A client may retrieve metadata from MDS 160 in order to identify a desired data storage location within storage subsystem 150. In alternative embodiments, the functions of MDS 160 may be performed by any of a variety of components such as a volume configuration daemon or other storage management processes or servers depending on the type and layout of storage devices in storage subsystem 150.

In the following discussion, data may be stored in stripe units of a given size that depends on the capacity of individual storage device locations. These stripe units may be data objects, data portions, chunks, or any other segment of data suited to the individual storage devices. However, from the client view, data stripe units may be of a different size. For example, a client may convey data to a storage subsystem in stripe units of a size sufficient to fill a row across a number of storage devices arranged in an array. A client may also convey data in a size smaller than a stripe unit. A variety of stripe layouts are possible and contemplated, some of which are described in further detail below. For a given row within storage subsystem 150, one of the storage devices may be designated as a coordinating storage device. In some embodiments, data may be stored without parity and the coordinating storage device in each row may coordinate storage of individual stripe units in the other storage devices in the row. In other embodiment involving redundant layouts, the coordinating storage device may coordinate storage of data as well as coordinating parity computation. Numerous such alternatives are possible and are contemplated.

Figure 2:
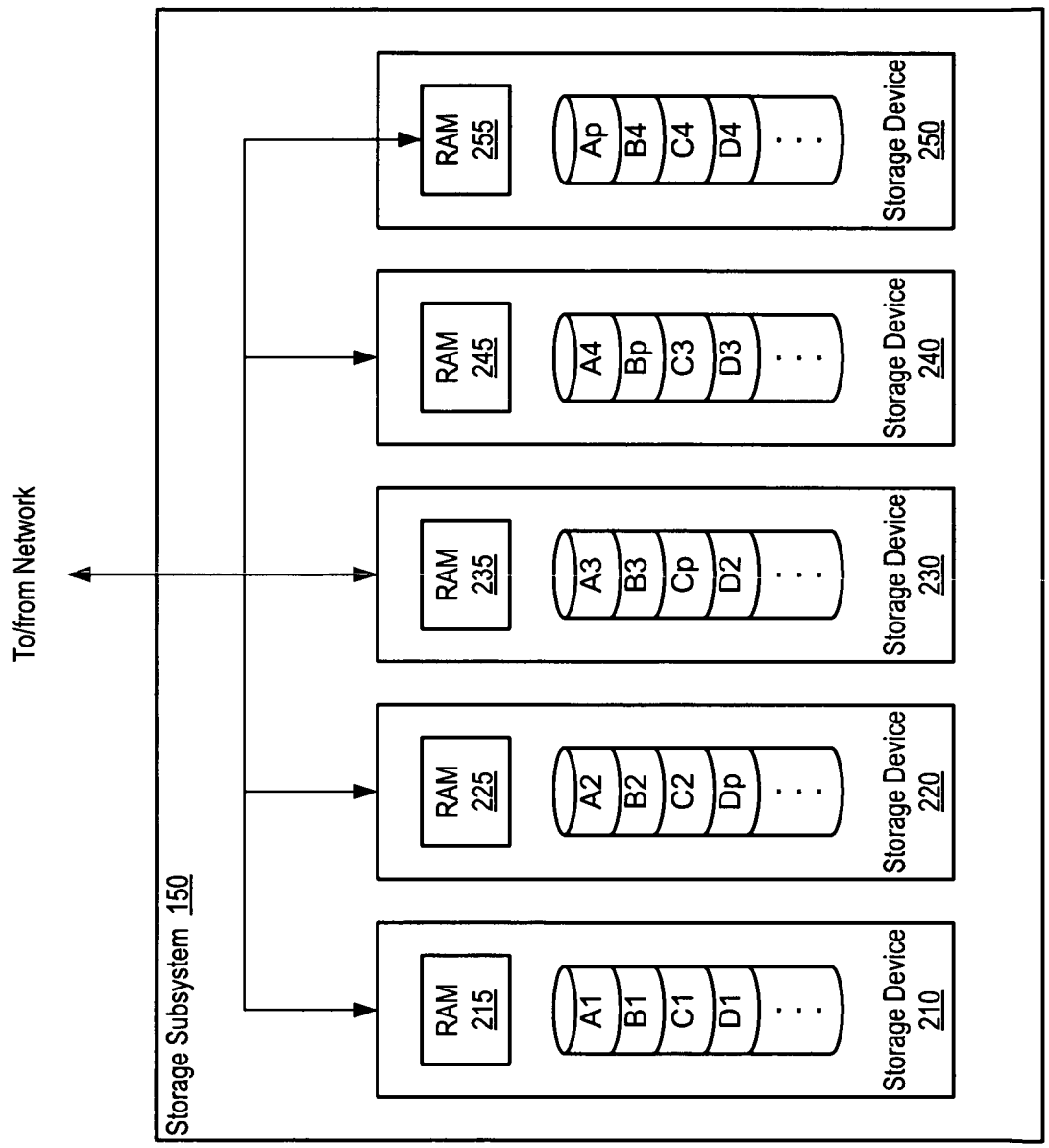
FIG. 2 is a generalized block diagram of one embodiment of a RAID-5 data storage subsystem.

Turning now to FIG. 2, a generalized block diagram of one embodiment of storage subsystem 150 is shown. In the illustrated embodiment, storage subsystem 150 includes storage devices 210, 220, 230, 240, and 250, arranged in a RAID-5 layout. Each of storage devices 210, 220, 230, 240, and 250 includes a corresponding one of a set of temporary storage devices 215, 225, 235, 245, and 255 such as random access memory (RAM). In one embodiment, storage devices 215, 225, 235, 245, and 255 may include non-volatile RAM (NVRAM). Data may be stored in stripe units striped in rows across the storage devices. In various RAID-5 embodiments, there may be a parity storage device and at least two data storage devices in each row, depending on the number of storage devices in the layout. For example, in the illustrated embodiment, a row may be defined as five stripe units each stored on one of storage devices 210, 220, 230, 240, and 250. Data may be striped across a portion of a row, a full row, or more than one row. Each row may include four data stripe units and a parity stripe unit. More particularly, the first row in the illustrated embodiment may include data stripe units A1, A2, A3, and A4 and parity stripe unit Ap stored in storage devices 210, 220, 230, 240, and 250, respectively. The second row may include data stripe units B1, B2, B3, and B4 and parity stripe unit Bp. Unlike the first row in which the parity stripe unit Ap was stored in storage device 250, the parity stripe unit Bp may be stored in storage device 240, while the data stripe units B1, B2, B3, and B4 may be stored in storage devices 210, 220, 230, and 250, respectively. The location of the parity stripe unit may be rotated among the storage devices on each successive row such as rows C and D, etc.

During operation, a client may write data to a given row as if writing to a RAID-0 layout. More specifically, the client may be told that the data is striped such that for each RAID-5 row, the entire row is stored in the storage device holding the parity stripe unit that is designated for that row and the stripe size is equal to the combined size of the other, non-parity stripe units in the row. The client may then send data for the entire row to the parity storage device. The parity storage device may then forward the one or more portions of the data to the component data storage devices in the given row according to a process that will be described in more detail below. Each storage device may store the parity or data in its associated RAM until the new parity has been calculated, at which time the write operation may be committed and the data and parity may be transferred from RAM to the associated stripe unit locations. The storage subsystem may return a write completion message to the client after the data and parity stripe units are stored in RAM but before the data and parity are transferred from RAM to the associated stripe unit locations, minimizing write latency. A dataset that is larger than the capacity of a single row may be written through a series of write operations, each having a width of one row or less and each being addressed to the corresponding parity storage device in its respective row.

Read operations may be handled in a similar manner. For example, a read request may also be sent from a client to the parity storage device in a given row. If the requested data is stored in the RAM associated with the parity storage device, the data may be retrieved and sent directly to the client in a response to the request. If the requested data is located on one or more other storage devices making up the row, the parity storage device may convey a corresponding read request to each storage device in the layout and receive in return a portion of the requested data. The parity storage device may then assemble the data and return it to the requesting client. If one or more portions of the data are located on a storage device that has failed, the parity storage device may retrieve the data from a sufficient number of the remaining storage devices making up the row and then reconstruct the missing data using the available data and parity.

Figure 3:
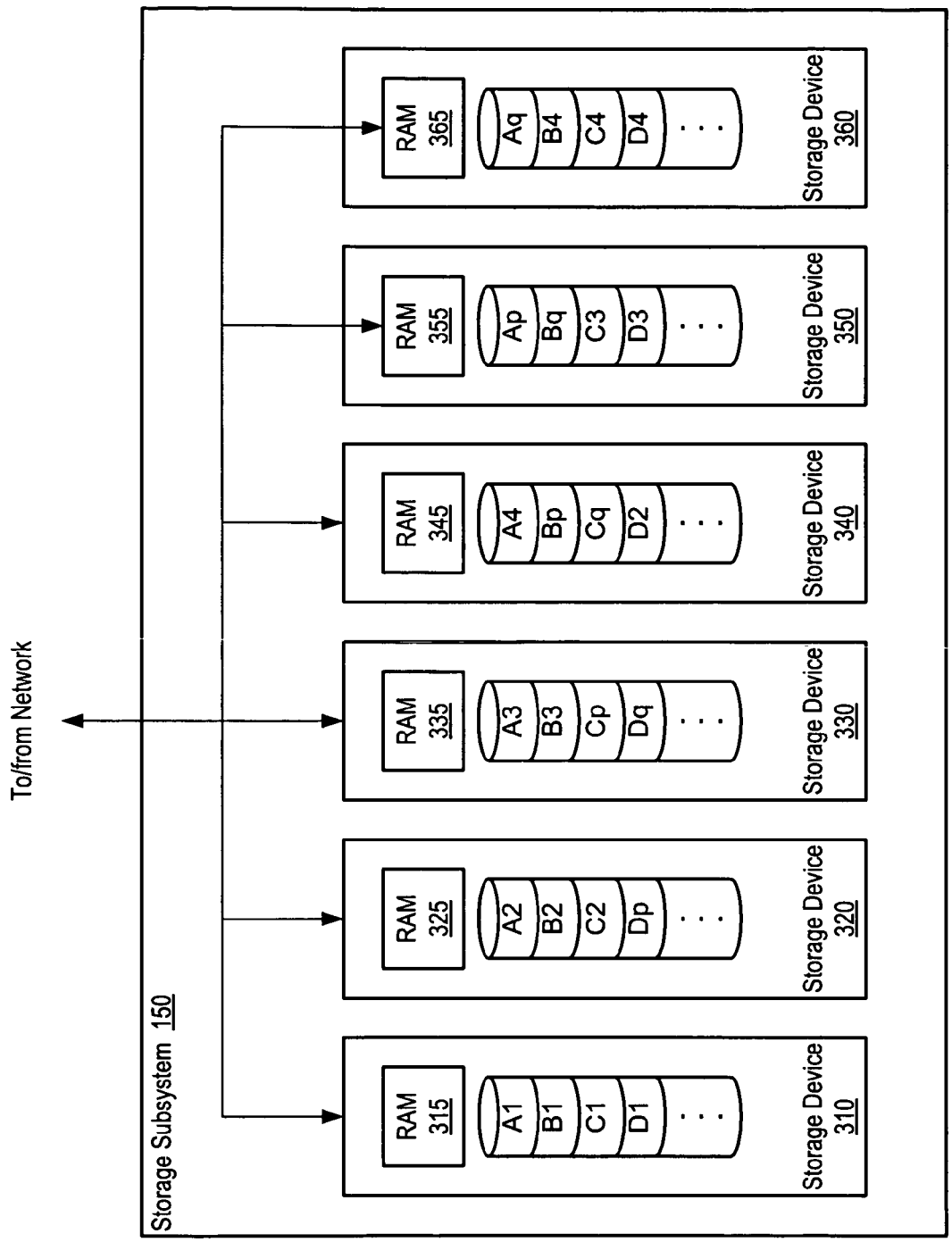
FIG. 3 is a generalized block diagram of one embodiment of a RAID-6 data storage subsystem.

FIG. 3 is a detailed block diagram of an alternative embodiment of storage subsystem 150. In the illustrated embodiment, data may be stored in storage subsystem 150 as stripe units. Storage subsystem 150 includes storage devices 310, 320, 330, 340, 350, and 360, arranged in a RAID-6 layout. Each of storage devices 310, 320, 330, 340, 350, and 360 includes a corresponding one of a set of temporary storage devices 315, 325, 335, 345, 355, and 365 such as random access memory (RAM). In one embodiment, storage devices 315, 325, 335, 345, 355, and 365 may include Flash RAM, MEMS (MicroElectroMechanical Systems) storage, battery-backed RAM, non-volatile RAM (NVRAM), or other persistent storage devices. Data may be striped across stripe units in rows on the storage devices.

In various RAID-6 embodiments, there may be two parity stripe units and at least two data stripe units in each row, depending on the number of storage devices in the layout. For example, in the illustrated embodiment, a row may be defined as six stripe units each stored on one of storage devices 310, 320, 330, 340, 350, and 360. Data may be striped across a portion of a row, a full row, or more than one row. Each row may include four data stripe units and two parity stripe units. More particularly, the first row in the illustrated embodiment may include data stripe units A1, A2, A3, and A4 and parity stripe units Ap and Aq stored in storage devices 310, 320, 330, 340, 350, and 360, respectively. The second row may include data stripe units B1, B2, B3, and B4 and parity stripe units Bp and Bq. Unlike the first row in which the parity stripe unit Ap may be stored in storage device 350 and Aq may be stored in storage device 360, the parity stripe unit Bp may be stored in storage device 340 and Bq may be stored storage device 350, while the data stripe units B1, B2, B3, and B4 may be stored in storage devices 310, 320, 330, and 360, respectively. The location of the parity storage devices may be rotated among the storage devices on each successive row such as rows C and D, etc.

During a write operation, a client may write data to a given row as if writing to a RAID-0 layout. More specifically, the client may be told that data is striped such that for each RAID-6 row, the entire row is stored in the primary parity storage device that is designated for that row (designated above with suffix letter "p") and the client stripe unit is equal to the combined size of the other, non-parity stripe units in the row. The client may then send data for the entire row to the primary parity storage device. The primary parity storage device may then forward the data to the component data storage devices and the secondary parity storage device (designated above with suffix letter "q") in the given row according to a process that will be described in more detail below. Each storage device may store the parity and/or data in its associated RAM until the new parity has been calculated, at which time the write operation may be committed and the data and parity may be transferred from RAM to the associated storage device. The storage subsystem may return a write completion message to the client after the data and parity stripe units are stored in RAM but before the data and parity are transferred from RAM to the associated storage device, minimizing write latency. A dataset that is larger than the capacity of a single row may be written through a series of write operations, each having a width of one row or less and each being addressed to the corresponding primary parity storage device in its respective row.

Read operations may be handled in a similar manner. For example, a read request may also be sent from a client to the primary parity storage device in a given row. If the requested data is stored in the RAM associated with the primary parity storage device, the data may be retrieved and sent directly to the client in a response to the request. If the requested data is located on one or more other storage devices making up the row, the primary parity storage device may convey a corresponding read request to each storage device in the layout and receive in return a portion of the requested data. The primary parity storage device may then assemble the data and return it to the requesting client. If one or more portions of the data are located on a storage device that has failed, the primary parity storage device may retrieve the data from a sufficient number of the remaining storage devices making up the row and then reconstruct the missing data using the available data and parity. Note that in the case of RAID-6 and other layouts with a significant amount of redundancy, it may not be necessary to retrieve data from all of the data and parity storage units; a subset of the data portions may be sufficient to reconstruct the missing data.

Figure 4:
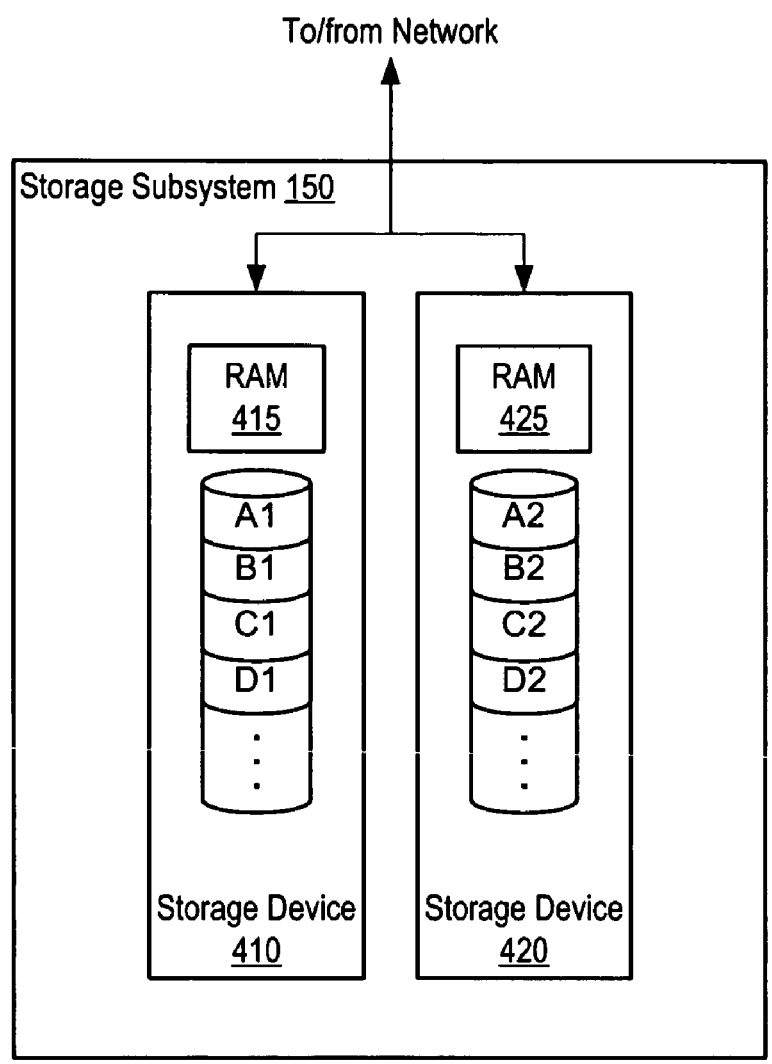
FIG. 4 is a generalized block diagram of one embodiment of a RAID-1 data storage subsystem.

FIG. 4 is a detailed block diagram of yet another alternative embodiment of storage subsystem 150. In the illustrated embodiment, data may be stored in storage subsystem 150 as stripe units. Storage subsystem 150 includes storage devices 410 and 420 arranged in a RAID-1 layout. In the illustrated embodiment, two storage devices are shown although in alternative RAID-1 layouts, more than two storage devices may be employed to increase the degree of redundancy. Each of storage devices 410 and 420 includes a corresponding one of a set of temporary storage devices 415 and 425 such as random access memory (RAM). In one embodiment, storage devices 415 and 425 may include Flash RAM, MEMS (MicroElectroMechanical Systems) storage, battery-backed RAM, non-volatile RAM (NVRAM), or other persistent storage devices. Data may be mirrored between storage devices 410 and 420. Data may be stored in a portion of a row, a full row, or more than one row. Each row may include a primary data stripe unit and a secondary stripe unit. For example, the first row in the illustrated embodiment may include data stripe unit A1 stored in storage devices 410 and data stripe unit A2 stored in storage device 420. The second row may include data stripe units B1 stored in storage devices 410 and data stripe unit B2 stored in storage device 420, etc. The location of the primary data storage device may be varied among the storage devices, such as alternating for each successive row or any other pattern that causes storage devices 410 and 420 to share responsibility for storing the primary data stripe unit.

During operation, a client may be told that the data is striped such that for each row of data, the data is stored in the primary device for the row. The client may send the data to the primary data storage device. The primary data storage device may then forward the data to the secondary data storage device in the given row. Each storage device may store the data in its associated RAM until the stripe unit is ready to be committed, providing an opportunity to sequence multiple write requests in the storage devices. The storage subsystem may return a write completion message to the client after the data stripe units are stored in RAM but before the data is transferred from RAM to the associated storage device, minimizing write latency. A dataset that is larger than the capacity of a single row may be written through a series of write operations, each having a width of one row or less and each being addressed to the corresponding primary data storage device in its respective row. It will be apparent to one of ordinary skill in the art that read operations may be similarly coordinated through the primary data storage device.

In still further embodiments of storage subsystem 150, an erasure-coding method may be employed. For example, in a Reed-Solomon scheme, the coordinating storage device may perform a calculation on K blocks of received data to produce M erasure-coded blocks such that only N of M blocks are needed to recover the original data, where N<M and usually, K<N. Numerous other suitable, redundant or erasure-coded storage schemes will be apparent to one of ordinary skill in the art.

Figure 5:
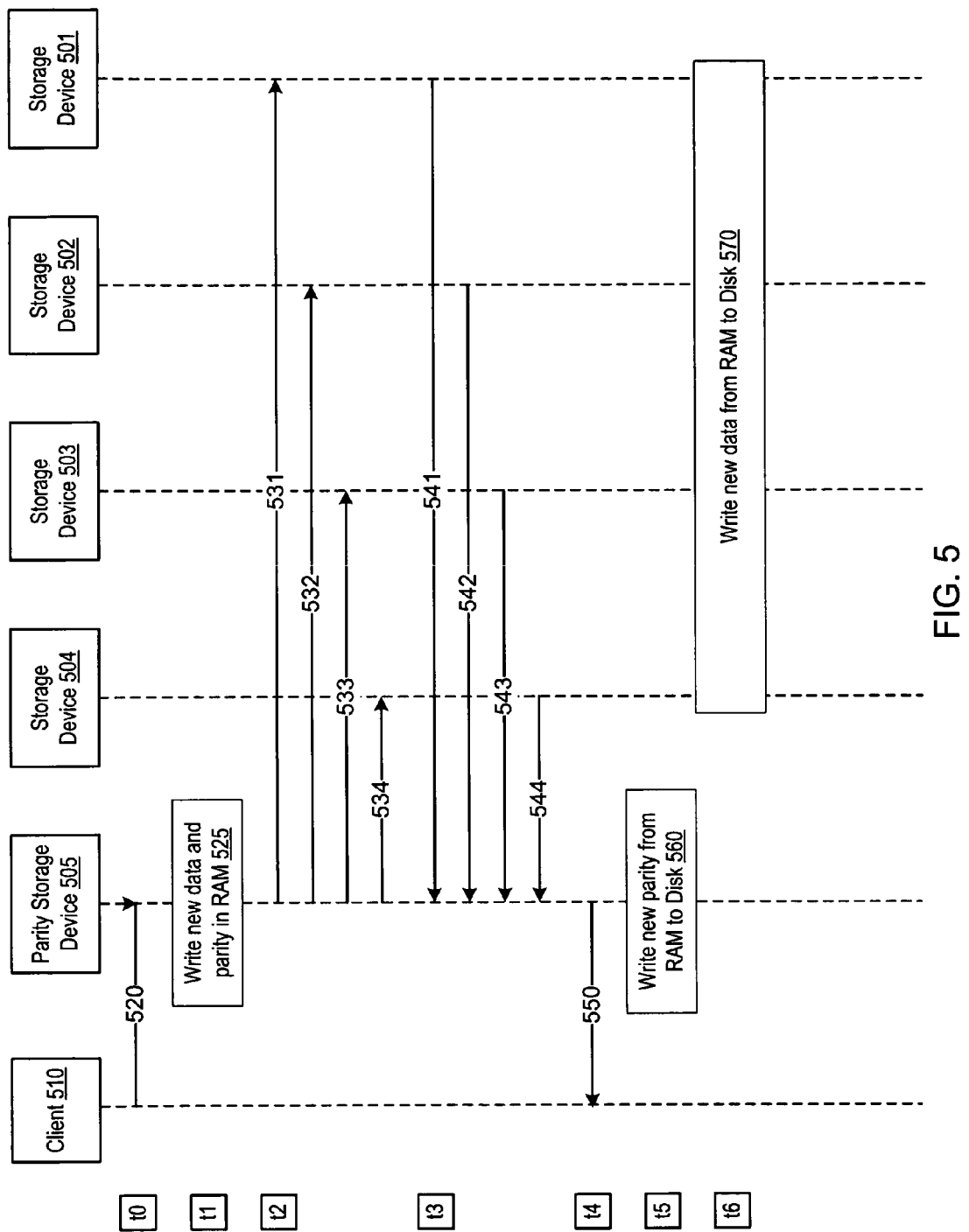
FIG. 5 is a sequence diagram illustrating one embodiment of a write transaction between a client and a row in a RAID-5 layout.

FIG. 5 is a sequence diagram illustrating one embodiment of a write transaction between a client and a row in a RAID-5 layout. In the illustrated embodiment, a client 510 is shown writing data to a row consisting of data storage devices 501-504 and parity storage device 505. The data size is assumed to be equal to the capacity of one row. At time t0, client 510 may send data to parity storage device 505 in message 520 including data to be stored in each of data storage devices 501-504. Client 510 need not be aware of the individual components of the row. Rather, client 510 may obtain the layout of the data storage including the location of parity storage device 505 and the size of the row from a metadata server. After parity storage device 505 receives the data, at time t1, parity storage device 505 may calculate a new parity stripe unit and store it and/or the data in its associated temporary storage device (block 525). At time t2, storage device 505 may begin a process of forwarding a portion of data to each of data storage devices 501-504 in messages 531-534, respectively. Each of storage devices 501-504 may store received data in its associated temporary storage device.

At time t3, storage device 505 may begin receiving acknowledgements from each of data storage devices 501-504 in messages 541-544, respectively. Once all of the acknowledgements have been received, at time t4, storage device 505 may send write complete message 550 to client 510. It is noted that write complete message 550 may not be sent to the client until the new data has been received and acknowledged by the data storage devices. This ensures that the data is redundantly stored and can be recovered in the event of the failure of any single device. Subsequently, at time t5, storage device 505 may calculate the new parity values based on the new data in it's associated temporary storage device and write it to its parity stripe unit location (block 560) or, if the new parity is already stored in its associated temporary storage device, write the new parity values from its associated temporary storage device to its parity stripe unit location (block 560). At time t6, each of data storage devices 501-504 may write data from its associated temporary storage device to its data stripe unit location, completing the write transaction (block 570).

A number of error recovery scenarios will next be described. In the case of a power failure or other temporary interruption of the storage devices that occurs between time t1 and time t2, the write may be discarded. Since the transfer of the new data and/or new parity to the temporary storage devices was incomplete, the partial data may be discarded once power is restored or the interruption is cured. In the case of a power failure or other temporary interruption after time t2, processing may continue after the power is restored and the remaining steps of the algorithm may be carried out as if no failure had occurred.

In the case of a power failure combined with the failure of a storage device other than the parity storage device, the parity storage device may detect the failure and send a message to the MDS to report the device failure. Alternatively, the parity storage device may send an error message to the client in lieu of a write completion message. In response, the client may contact the MDS to report the error. Upon receiving an error message from the client or from the parity storage device, the MDS may select a new storage device to replace the failed device and cause the contents of the stripe to be rebuilt based on the data stored in the remaining storage devices. If the device failure occurs before all of the devices in the row have received and stored their respective portions of data, a complete copy of the write data may be obtained from the parity storage device to complete the write operation.

In the case of a power failure combined with the failure of the parity storage device, the MDS may recognize the failure of the parity storage device via conventional techniques such as polling, etc. and select a new storage device to replace it. The new parity storage device may recalculate parity values by reading the data from the other storage devices and storing the resulting values in the new storage location. In some embodiments parity recalculation may be performed by another device, such as the MDS.

Figure 6:
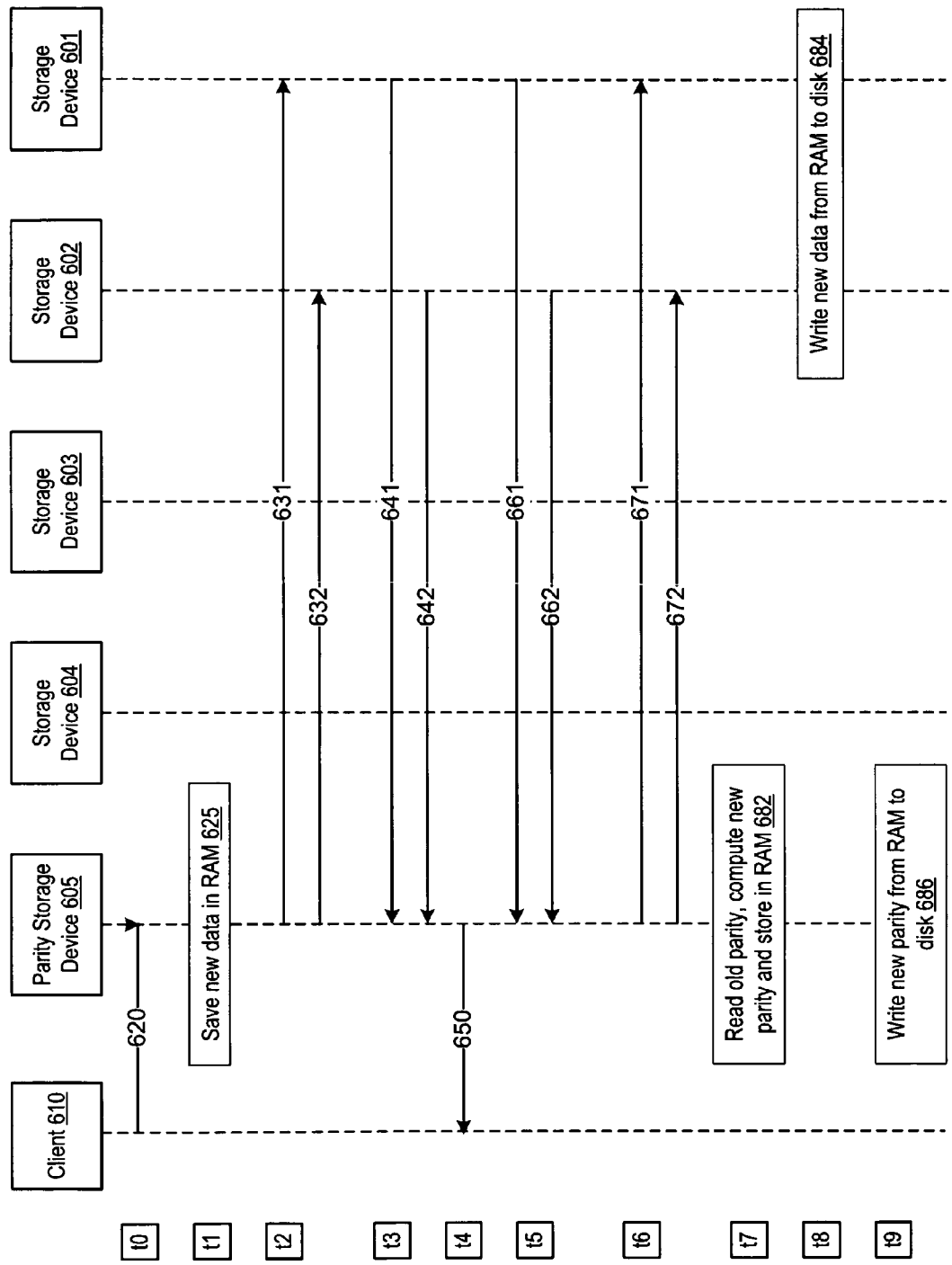
FIG. 6 is a sequence diagram illustrating one embodiment of a write transaction between a client and a partial row in a RAID-5 layout.

FIG. 6 is a sequence diagram illustrating one embodiment of a write transaction between a client and a partial row in a RAID-5 layout. In the illustrated embodiment, a client 610 is shown writing data to a row consisting of data storage devices 601-604 and parity storage device 605. The data size is assumed to be less than the capacity of one row. At time t0, client 610 may send data to parity storage device 605 in message 620 including data to be stored in each of data storage devices 601 and 602. Client 610 need not be aware of the individual components of the row. Rather, client 610 may obtain or be told the layout of the data storage including the location of parity storage device 605 and the size of the data stripe unit needed to store the data from a metadata server. After parity storage device 605 receives the data, at time t1, parity storage device 605 may store the data in its associated temporary storage device (block 625).

At time t2, storage device 605 may begin a process of forwarding a portion of the data to each of data storage devices 601 and 602 in messages 631 and 632, respectively. Each of storage devices 601 and 602 may store received data in its associated temporary storage device. At time t3, storage device 605 may begin receiving acknowledgements from each of data storage devices 601 and 602 in messages 641 and 642, respectively. Once all of the acknowledgements have been received, at time t4, storage device 605 may send write complete message 650 to client 610. Subsequently, at time t5, each of data storage devices 601 and 602 may send a copy of the old data that was stored in its associated data storage location to storage device 605 in messages 661 and 662, respectively. After receiving messages 661 and 662, at time t6, storage device 605 may send acknowledgements to each of data storage devices 601 and 602 in messages 671 and 672, respectively. Subsequently, at time t7, storage device 605 may use old data received from storage devices 601 and 602 and new data received from client 610 to compute new parity values, storing the results in its associated temporary storage device (block 682). At time t8, each of data storage devices 601 and 602 may write data from its associated temporary storage device to its data storage location (block 684). At time t9, storage device 605 may write the new parity values from its associated temporary storage device to its parity data storage location, completing the write transaction (block 686). As may be apparent to one or ordinary skill in the art, error recovery is similar to the process described above regarding a write transaction between a client and a complete row in a RAID-5 layout and therefore will not be described further.

Figure 7:
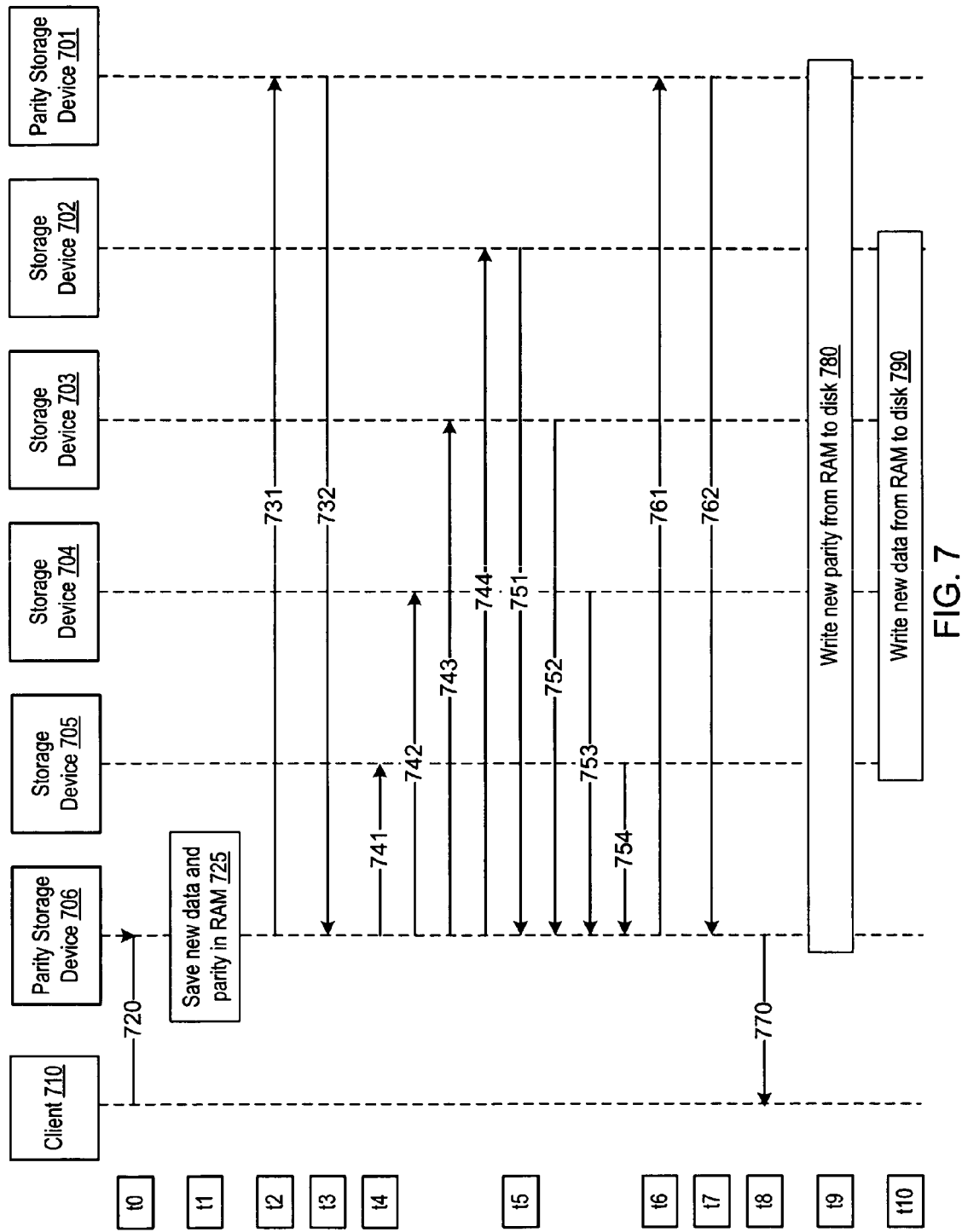
FIG. 7 is a sequence diagram illustrating one embodiment of a write transaction between a client and a row in a RAID-6 layout.

FIG. 7 is a sequence diagram illustrating one embodiment of a write transaction between a client and a row in a RAID-6 layout. In the illustrated embodiment, a client 710 is shown writing data to a row consisting of data storage devices 702-705 and parity storage devices 701 and 706. The data size is assumed to be equal to the capacity of one row. At time t0, client 710 may send data to parity storage device 706 in message 720 including data to be stored in each of data storage devices 702-705. Client 710 need not be aware of the individual components of the row. Rather, client 710 may obtain or be told the layout of the data storage including the location of primary parity storage device 706 and the size of the row from a metadata server. After primary parity storage device 706 receives the data, at time t1, primary parity storage device 706 may store the new data in its associated temporary storage device, calculate new primary parity values, and store the primary parity values in its associated temporary storage device (block 725).

At time t2, storage device 706 may send the new data to secondary parity storage device 701 in message 731. Secondary parity storage device 701 may store the new data in its associated temporary storage device. At time t3, secondary parity storage device 701 may send an acknowledgment back to primary parity storage device 706 in message 732. Once the acknowledgement has been received, at time t4, storage device 706 may begin a process of forwarding a portion of data to each of data storage devices 705-702 in messages 741-744, respectively. Each of storage devices 705-702 may store received data in its associated temporary storage device. At time t5, storage device 706 may begin receiving acknowledgements from each of data storage devices 702-705 in messages 751-754, respectively. Once all of the acknowledgements have been received, at time t6, storage device 706 may send a write complete message to storage device 701 in message 761. Storage device 701 may compute the value of the new parity stripe unit based on the data, set the state of the secondary parity stripe unit location to complete, and send an acknowledgement back to storage device 706 in message 762 at time t7.

At time t8, storage device 706 may send write complete message 770 to client 710. Subsequently, at time t9, storage devices 706 and 701 may write the new parity values from their associated temporary storage devices to their parity stripe unit locations (block 780). At time t10, each of data storage devices 702-705 may write data from its associated temporary storage device to its data stripe unit location, completing the write transaction (block 790). Although in the above description, primary parity storage device 706 may compute new primary parity values at time t1 and secondary storage device 701 may compute new primary parity values at time t7, in alternative embodiments storage devices 701 and 706 may compute new parity values from the new data at any time after receiving the new data and before time t9.

A number of error recovery scenarios will next be described. In the case of a power failure or other temporary interruption of the storage devices that occurs between time t1 and time t2, the write may be discarded. Since the transfer of the new data and/or new parity to the temporary storage devices was incomplete, the partial data may be discarded once power is restored or the interruption is cured. In the case of a power failure or other temporary interruption after time t2, processing may continue after the power is restored and the remaining steps of the algorithm may be carried out as if no failure had occurred.

In the case of a power failure combined with the failure of a storage device other than either of the parity storage devices, either of the parity storage devices may detect the failure and send a message to the MDS to report the device failure. Alternatively, the primary parity storage device may send an error message to the client in lieu of a write completion message. In response, the client may contact the MDS to report the error. Upon receiving an error message from the client or from a parity storage device, the MDS may select a new storage device to replace the failed device and cause the contents of the stripe to be rebuilt based on the data stored in the remaining storage devices. If the device failure occurs before all of the devices in the row have received and stored their respective portions of data, a complete copy of the write data may be obtained from either of the parity storage devices to complete the write operation.

In the case of a power failure combined with the failure of a parity storage device, the MDS may recognize the failure of the parity storage device via conventional techniques such as polling, etc. and select a new storage device to replace it. The new parity storage device may recalculate parity values by reading the data from the other storage devices and storing the resulting values in the new storage location. In some embodiments parity recalculation may be performed by another device, such as the MDS.

Figure 8:
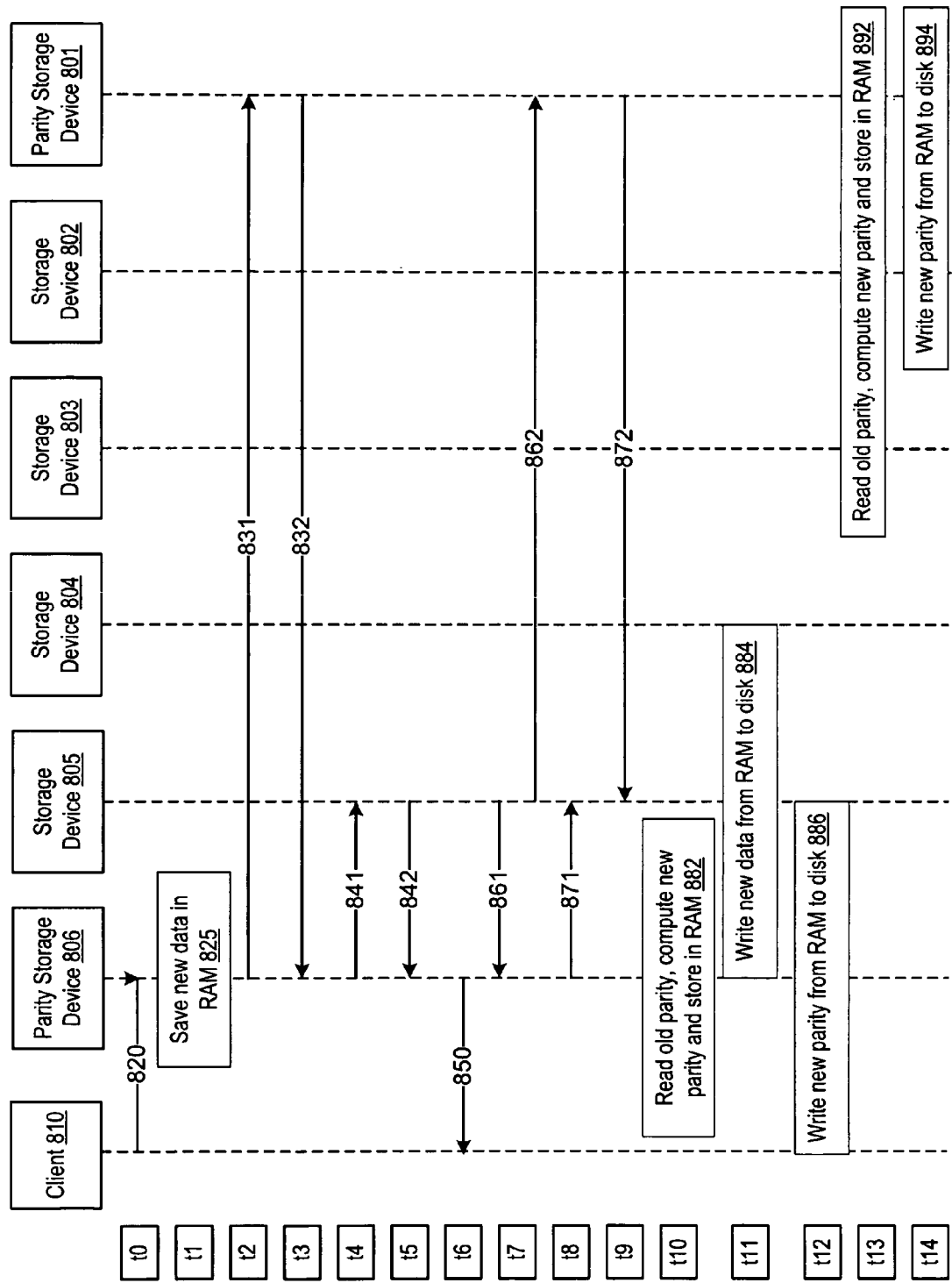
FIG. 8 is a sequence diagram illustrating one embodiment of a write transaction between a client and a partial row in a RAID-6 layout.

FIG. 8 is a sequence diagram illustrating one embodiment of a write transaction between a client and a partial row in a RAID-6 layout. In the illustrated embodiment, a client 810 is shown writing data to a row consisting of data storage devices 802-805 and parity storage devices 801 and 806. The data size is assumed to be less than the capacity of one row. At time t0, client 810 may send data to parity storage device 806 in message 820 including data to be stored in storage device 805. Client 810 need not be aware of the individual components of the row. Rather, client 810 may obtain or be told the layout of the data storage including the location of primary parity storage device 806 and the size of the data stripe unit needed to store the data from a metadata server. After primary parity storage device 806 receives the data, at time t1, parity storage device 806 may store the data in its associated temporary storage device (block 825).

At time t2, storage device 806 may send the new data to secondary parity storage device 801 in message 831. Secondary parity storage device 801 may store the new data in its associated temporary storage device. At time t3, secondary parity storage device 801 may send an acknowledgment back to primary parity storage device 806 in message 832. Once the acknowledgement has been received, at time t4, storage device 806 may begin a process of forwarding a portion of data to storage device 805 in message 841. Storage device 805 may store received data in its associated temporary storage device. At time t5, storage device 806 may receive an acknowledgement from storage device 805 in message 842. Once the acknowledgement has been received, at time t6, storage device 805 may send write complete message 850 to client 810. Subsequently, at time t7, data storage device 805 may send a copy of the old data that was stored in its associated data stripe unit location to storage device 806 in message 861 and to storage device 801 in message 862. After receiving message 861, at time t8, storage device 806 may send an acknowledgement to data storage device 805 in message 871.

After receiving message 862, at time t9, storage device 801 may send an acknowledgement to data storage device 805 in message 872. Subsequently, at time t10, storage device 806 may use old data received from storage device 805 and new data received from client 810 to compute new parity values, storing the results in its associated temporary storage device (block 882). At time t11, data storage device 805 may write data from its associated temporary storage device to its associated data stripe unit location (block 884). At time t12, storage device 806 may write the new parity values from its associated temporary storage device to its parity stripe unit location (block 886). At time t13, storage device 801 may use old data received from storage device 805 and new data received from storage device 806 to compute new parity values, storing the results in its associated temporary storage device (block 892). At time t14, storage device 801 may write the new parity values from its associated temporary storage device to its parity stripe unit location, completing the write transaction (block 894). As may be apparent to one or ordinary skill in the art, error recovery is similar to the process described above regarding a write transaction between a client and a complete row in a RAID-6 layout and therefore will not be described further.

Figure 9:
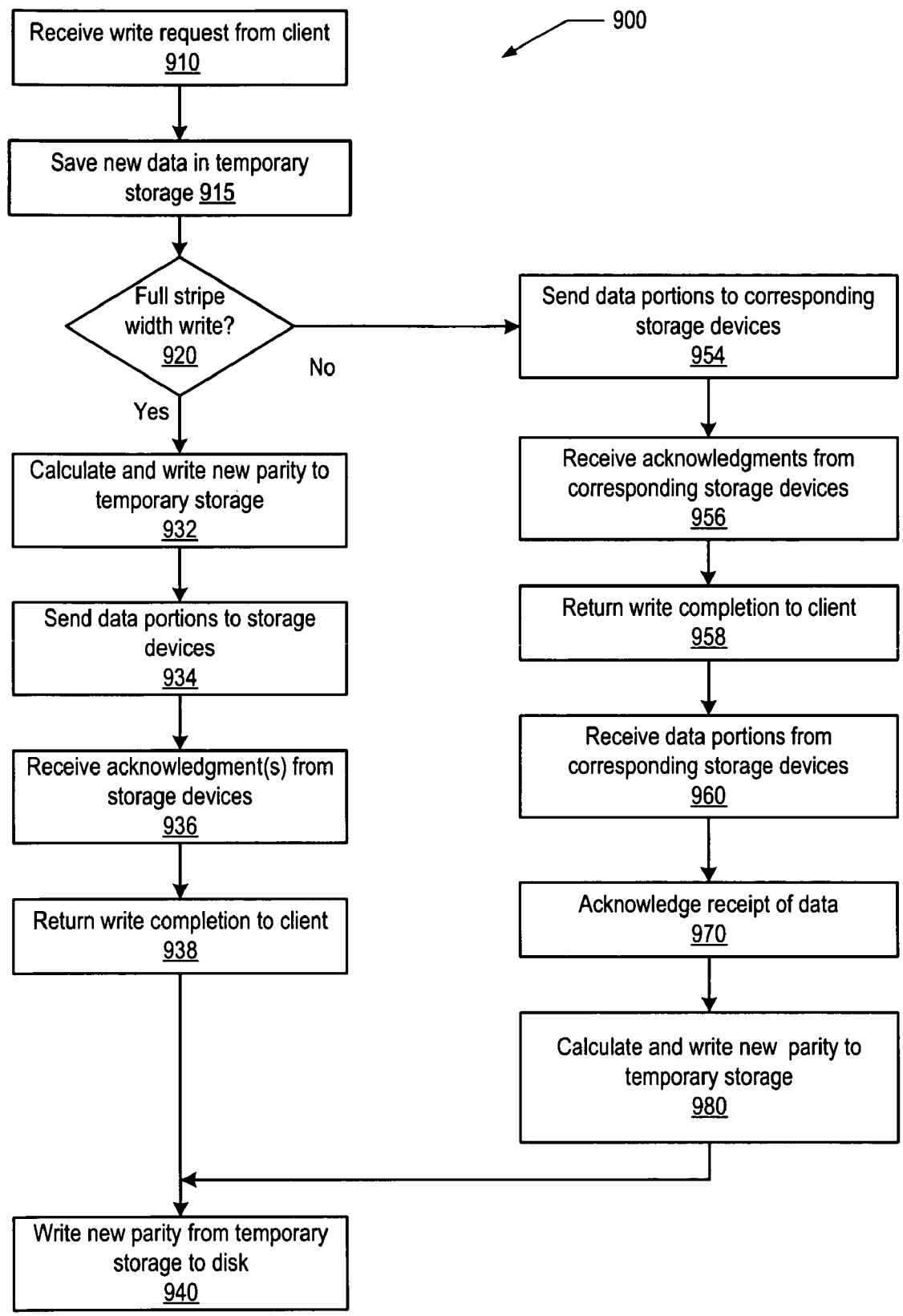
FIG. 9 illustrates one embodiment of a process that may be used during a write transaction between a client and a row in a RAID-5 layout by a parity storage device in the RAID 5 layout.

FIG. 9 illustrates one embodiment of a process 900 that may be used during a write transaction between a client and a row in a RAID-5 layout by a parity storage device in the RAID 5 layout. Process 900 may begin when the parity storage device receives a write request from a client (block 910). In one embodiment, the primary parity storage device may store the new data in an associated temporary storage device (block 915). If the write request contains data for the full width of a RAID-5 row (decision block 920), then the parity storage device may calculate new parity values and store them along with the new data in an associated temporary storage device (block 932). Subsequently, the parity storage device may send portions of data to each of the data storage devices in the RAID-5 row (block 934) and wait for acknowledgements. When acknowledgements have been received from all of the data storage devices in the RAID-5 row (block 936), the parity storage device may return a write completion message to the client (block 938). After the write completion message has been sent, the parity storage device may write the new parity values from the associated temporary storage device to the parity stripe unit location within the parity storage device, completing the write operation (block 940).

If the write request contains data for only a portion of a RAID-5 row (decision block 920), then the parity storage device may send the new data from the write request to the corresponding storage devices that are data storage devices in its RAID-5 row (block 954) and wait for acknowledgements. When acknowledgements have been received from all of the corresponding data storage devices in the RAID-5 row (block 956), the parity storage device may return a write completion message to the client (block 958). After the write completion message has been sent, the parity storage device may receive copies of old portions of data from each of the storage devices that are data storage devices in its RAID-5 row (block 960). The parity storage device may send acknowledgements to each of the corresponding storage devices that are data storage devices in its RAID-5 row (block 970) and calculate new parity values from the old parity values, the old portions of data, and the new portions of data, and write the resulting values into an associated temporary storage device (block 980). The parity storage device may then write the new parity values from the associated temporary storage device to the parity stripe unit location within the parity storage device, completing the write operation (block 940).

Figure 10:
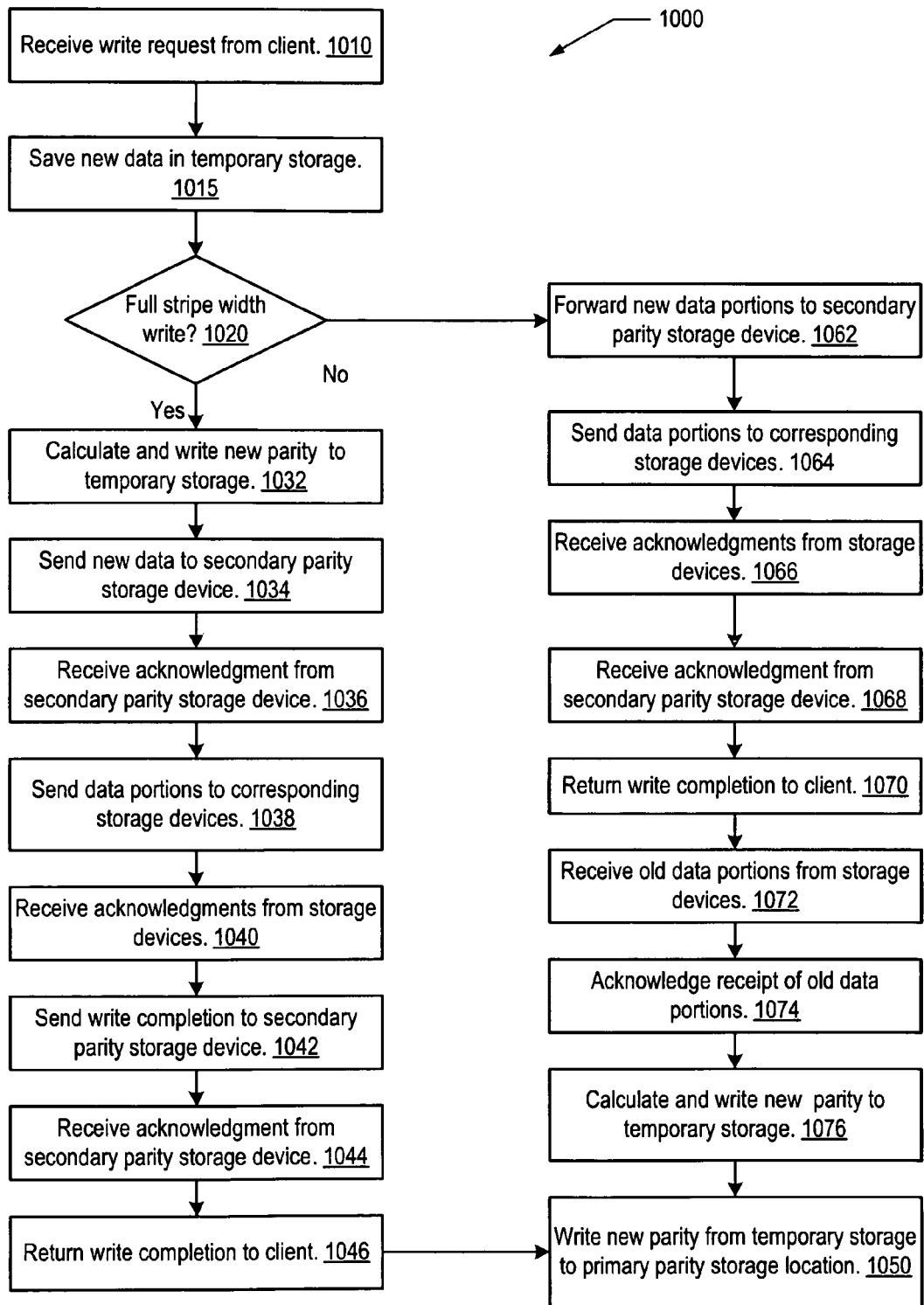
FIG. 10 illustrates one embodiment of a process that may be used during a write transaction between a client and a row in a RAID-6 layout by a primary parity storage device in the RAID-6 layout.

FIG. 10 illustrates one embodiment of a process 1000 that may be used during a write transaction between a client and a row in a RAID-6 layout by a primary parity storage device in the RAID-6 layout. Process 1000 may begin when the primary parity storage device receives a write request from a client (block 1010). In one embodiment, the primary parity storage device may store the new data in an associated temporary storage device (block 1015). If the write request contains data for the full width of a RAID-6 row (decision block 1020), then the primary parity storage device may calculate new primary parity values and store them in an associated temporary storage device (block 1032). Subsequently, the primary parity storage device may send the new data to the secondary parity storage device and wait for acknowledgement (block 1034). When acknowledgement has been received from the secondary parity storage device (block 1036), the primary parity storage device may send portions of data to each of the data storage devices in the RAID-6 row (block 1038) and wait for acknowledgements. When acknowledgements have been received from all of the data storage devices in the RAID-6 row (block 1040), the primary parity storage device may return a write completion message to the secondary parity storage device and wait for an acknowledgement (block 1042).

After an acknowledgement has been received (block 1044), primary parity storage device may return a write completion message to the client (block 1046). Once the write completion message has been sent, the primary parity storage device may write the new parity values from the associated temporary storage device to the primary parity stripe unit location within the primary parity storage device, completing the write operation (block 1050).

If the write request contains data for the only a portion of a RAID-6 row (decision block 1020), then the primary parity storage device may forward a copy of the new data to the storage device that is the secondary parity storage device in its RAID-6 row (block 1062). The primary parity storage device may also send the new data from the write request to the storage devices that are targeted data storage devices in its RAID-6 row (block 1064) and wait for acknowledgements. When acknowledgements have been received from all of the data storage devices to which data was sent (block 1066) and from the secondary parity storage device in its RAID-6 row (block 1068), the primary parity storage device may return a write completion message to the client (block 1070). After the write completion message has been sent, the primary parity storage device may receive copies of old portions of data from each of the storage devices that received new data in its RAID-6 row (block 1072). The primary parity storage device may send acknowledgements to each of the storage devices from which it received old portions of data (block 1074), calculate new parity values from the old parity values, the old portions of data, and the new portions of data, and write the resulting values into an associated temporary storage device (block 1076). The primary parity storage device may then write the new parity values from the associated temporary storage device to the parity stripe unit locations within the primary parity storage device, completing the write operation (block 1050).

Figure 11:
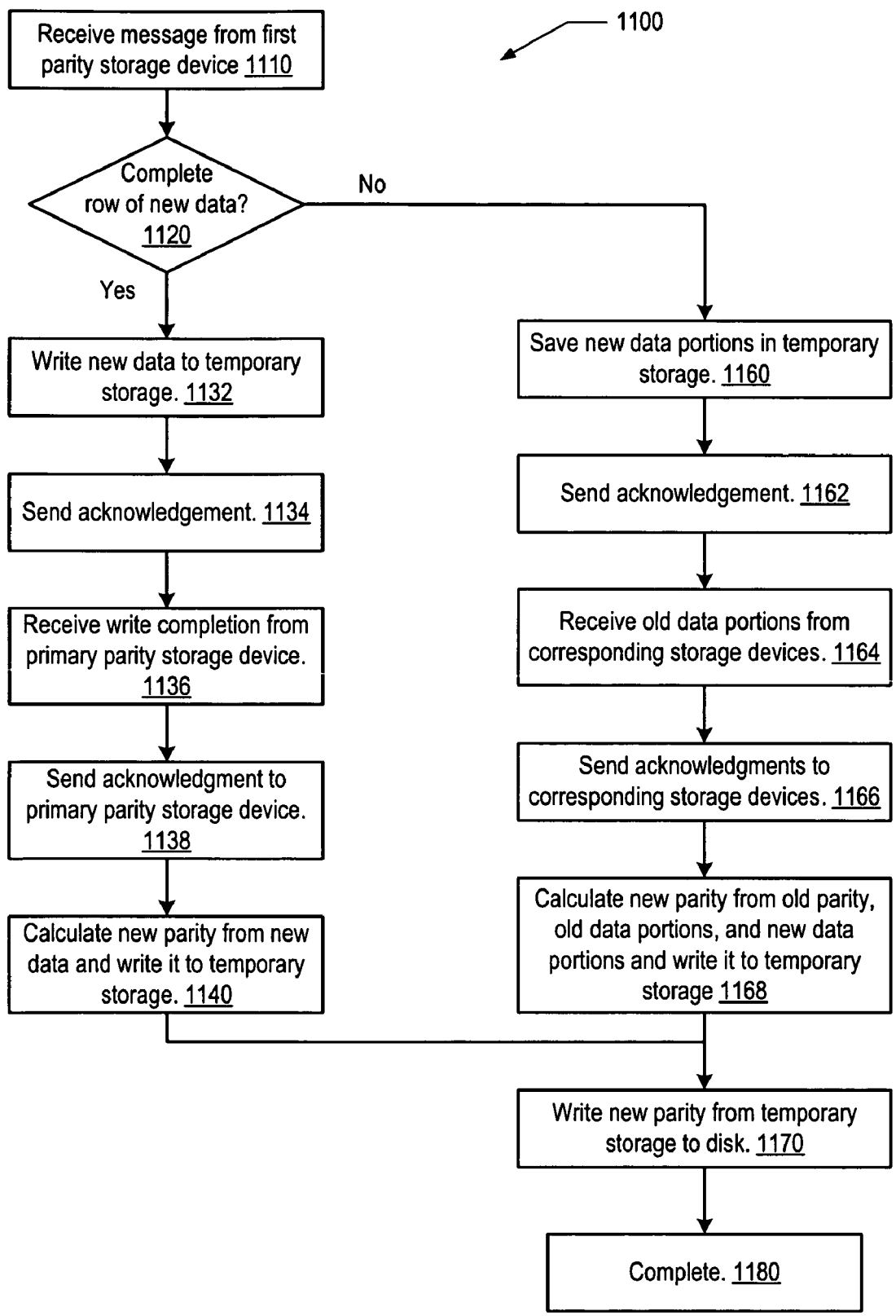
FIG. 11 illustrates one embodiment of a process that may be used during a write transaction between a client and a row in a RAID-6 layout by a secondary parity storage device in the RAID-6 layout.

FIG. 11 illustrates one embodiment of a process 1100 that may be used during a write transaction between a client and a row in a RAID-6 layout by a secondary parity storage device in the RAID-6 layout. Process 1100 may begin when the secondary parity storage device receives a message from the primary parity storage device in its RAID-6 row including new data (block 1110). If the message includes new data sufficient to fill a complete row in the RAID-6 layout (decision block 1120), the secondary parity storage device may store the new data in an associated temporary storage device (block 1132) and send an acknowledgement to the primary parity storage device (block 1134). Subsequently, the secondary parity storage device may receive a write completion message from the primary parity storage device in its RAID-6 row (block 1136). The secondary parity storage device may send an acknowledgement to the primary parity storage device (block 1138), calculate new secondary parity values, and write the new secondary parity values from the associated temporary storage device to the parity stripe unit location within the secondary parity storage device (block 1140). The secondary parity storage device may then write the new parity values from the associated temporary storage device to the parity stripe unit location within the secondary parity storage device (block 1170), completing the write operation (block 1180).

If the message from the primary parity storage device does not include data sufficient to fill a complete row in the RAID-6 layout, but includes new portions of data (decision block 1120), the secondary parity storage device may store the new data portions in an associated temporary storage device (block 1160) and send an acknowledgement to the primary parity storage device (block 1162). Subsequently, the secondary parity storage device may receive a copy of the old portions of data for which new data is targeted from their respective data storage devices (block 1164). The secondary parity storage device may send an acknowledgement to each of the storage devices from which it received old portions of data (block 1166). Then, the secondary parity storage device may calculate new secondary parity values from the old secondary parity values, the old portions of data, and the new portions of data, and write the resulting values into an associated temporary storage device (block 1168). The secondary parity storage device may then write the new parity values from the associated temporary storage device to the parity stripe unit location within the secondary parity storage device (block 1170), completing the write operation (block 1180). It is noted that the foregoing flow charts are for purposes of discussion only. In alternative embodiments, the elements depicted in the flow charts may occur in a different order, or in some cases concurrently. For example, in FIG. 5, time t6, at which each of data storage devices 501-504 may write data from its associated temporary storage device to its data stripe unit location (block 570), may occur prior to time t5, at which storage device 505 may calculate the new parity values based on the new data in it's associated temporary storage device and write it to its parity stripe unit location (block 560). Similarly, in FIG. 6, time t8 may occur before time t7 and in FIG. 8, time t11 may occur before time t10, etc. Also, in FIG. 9, the parity storage device may write the new parity values from the associated temporary storage device to the parity stripe unit location within the parity storage device, completing the write operation (block 940) before the write completion message has been sent to the client (block 938). Similarly, in FIG. 10, the primary parity storage device may write the new parity values from the associated temporary storage device to the primary parity stripe unit location within the primary parity storage device (block 1050) before the write completion message has been sent to the client (block 1046), etc. Numerous such alternatives are possible and are contemplated. Additionally, some of the flow chart elements may not be present in various embodiments, or may be combined with other elements. All such alternatives are contemplated.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
    a client; and
    a storage subsystem coupled to the client, wherein the storage subsystem comprises a plurality of data storage locations addressable as rows and columns in an array, each column of the array comprising a separate storage device of a plurality of storage devices;
    wherein at least two of the separate storage devices of the plurality of storage devices are predetermined as coordinating storage devices for different rows of the array, and wherein for a corresponding row in the array, only a single storage device is configured to act as a coordinating storage device at a given time;
    wherein for a given row in the array, a coordinating storage device is configured to:
        receive data from the client for storage in the given row;
        forward one or more portions of the received data to one or more other ones of the plurality of storage devices; and
        coordinate the computation and storage of redundant data in the given row.

2. The system as recited in claim 1, wherein in response to receiving a portion of data targeted for storage in a given storage location of a particular storage device, a non-volatile temporary storage device associated with the particular storage device is configured to buffer the received portion of data prior to the received portion of data being stored in the given storage location.

3. The system as recited in claim 2, wherein the coordinating storage device is further configured to convey a write completion message to the client in response to detecting that one or more copies of the one or more portions of data have been buffered in a non-volatile temporary storage devices associated with one or more storage devices of the given row.

4. The system as recited in claim 3, wherein the system is configured to:
   detect a failure of at least one of the plurality of storage devices; and
   if the failure occurred after a write completion message has been conveyed and before at least a portion of the buffered data has been transferred from the non-volatile temporary storage devices to associated storage locations in a given row, rebuild the data stored in the given row including the at least some redundant data from the data that was stored in the non-volatile temporary storage devices; and
   if the failure occurred after the buffered data has been transferred from the non-volatile temporary storage devices to associated storage locations in a given row, rebuild the data stored in the given row including the at least some redundant data from the data that was stored in the given row.

5. The system as recited in claim 1, wherein the coordinating storage device is further configured to compute first parity values of a plurality of portions of data stored in the given row.

6. The system as recited in claim 5, wherein in response to detecting that data for computing parity values have been received by the coordinating storage device for the given row, non-volatile temporary storage devices associated with each of the plurality of storage devices are further configured to transfer a buffered portion of data to a storage location in the given row of the associated storage device.

7. The system as recited in claim 1, wherein the array utilizes at least one of a RAID-1 layout, a RAID-5 layout, a RAID-6 layout, or another erasure-coded layout.

8. The system as recited in claim 5,
   wherein for a given row in the array, the coordinating storage device is further configured to forward the one or more received portions of data to a second one of the separate storage devices in the given row; and
   wherein the second one of the separate storage devices is configured to compute second parity values of a plurality of portions of data stored in the given row using the forwarded portions of data.

9. A method of storing data in storage locations of an array comprising a plurality of storage devices, wherein the storage locations are addressable as rows and columns, each column of the array comprising a separate storage device, the method comprising:
   designating at least two of the separate storage devices of the plurality of storage devices as coordinating storage devices for different rows of the array, wherein for a corresponding row in the array, only a single storage device is configured to act as a coordinating storage device at a given time;
   receiving data at a predetermined one of the plurality of storage devices designated as a coordinating storage device for a given row of the array, wherein the data is targeted for storage in the given row; and
   forwarding one or more portions of the data from the predetermined coordinating storage device to one or more other ones of the plurality of storage devices.

10. The method of claim 9, wherein in response to receiving a portion of data targeted for storage in a given storage location of a particular storage device, the method further comprises a non-volatile temporary storage device associated with the particular storage device buffering the received portion of data prior to the received portion of data being stored in the given storage location.

11. The method as recited in claim 10, further comprising conveying a write completion message to a client in response to detecting that one or more copies of the one or more portions of data have been buffered in non-volatile temporary storage devices associated with one or more storage devices of the given row.

12. The method as recited in claim 11, further comprising:
    detecting a failure of at least one of the plurality of storage devices; and
    if the failure occurred after a write completion message has been conveyed and before at least a portion of the buffered data has been transferred from the non-volatile temporary storage devices to associated storage locations in a given row, rebuilding the data stored in the given row including at least some redundant data from the data that was stored in the non-volatile temporary storage devices; and
    if the failure occurred after the buffered data has been transferred from the non-volatile temporary storage devices to associated storage locations in a given row, rebuilding the data stored in the given row including the at least some redundant data from the data that was stored in the given row.

13. The method as recited in claim 9, further comprising the coordinating storage device computing parity values of a plurality of portions of data stored in the given row.

14. The method as recited in claim 13, wherein in response to detecting that data for computing parity values have been received by the coordinating storage device for the given row, the method further comprises non-volatile temporary storage devices associated with each of the plurality of storage devices transferring a buffered portion of data to a storage location in the given row of the associated storage device.

15. The method as recited in claim 9, wherein the array utilizes at least one of a RAID-1 layout, a RAID-5 layout, a RAID-6 layout, or another erasure-coded layout.

16. A plurality of computer readable storage media storing computer instructions that are executable by a processor to:
    access storage locations of a storage array comprising a plurality of storage devices, wherein the storage locations are addressable as rows and columns, each column of the array comprising a separate storage device;
    designate at least two of the separate storage devices of the plurality of storage devices as coordinating storage devices for different rows of the array, wherein for a corresponding row in the array, only a single storage device is configured to act as a coordinating storage device at a given time;
    receive data at a predetermined one of the plurality of storage devices designated as a coordinating storage device for a given row of the array, wherein the data is targeted for storage in the given row; and
    forward one or more portions of the data from the predetermined coordinating storage device to one or more other ones of the plurality of storage devices.

17. The computer readable storage media of claim 16, wherein the instructions are further executable to buffer the received portion of data in a non-volatile temporary storage device associated with a storage device that includes a given storage location, in response to receiving a portion of data targeted for storage in the given storage location.

18. The computer readable storage media as recited in claim 17, wherein the instructions are further executable to convey a write completion message to a client in response to detecting that one or more copies of the one or more portions of data have been buffered in non-volatile temporary storage devices associated with one or more storage devices of a given row.

19. The computer readable storage media as recited in claim 18, wherein the instructions are further executable to:

detect a failure of at least one of the plurality of storage devices; and if the failure occurred after a write completion message has been conveyed and before at least a portion of the buffered data has been transferred from the non-volatile temporary storage devices to associated storage locations in a given row, rebuild the data stored in the given row including the at least some redundant data from the data that was stored in the non-volatile temporary storage devices; and if the failure occurred after the buffered data has been transferred from the non-volatile temporary storage devices to associated storage locations in a given row, rebuild the data stored in the given row including the at least some redundant data from the data that was stored in the given row.

20. The computer readable storage media as recited in claim 16, wherein the instructions are further executable to:

cause the coordinating storage device to compute parity values of a plurality of portions of data stored in the given row; and cause each non-volatile temporary storage device to transfer a buffered portion of data to a storage location in the given row of an associated separate storage device, in response to detecting that data for computing parity values have been received by the coordinating storage device for the given row.

* * * * *